United States Patent

Peltenburg et al.

[11] Patent Number: 5,605,114
[45] Date of Patent: Feb. 25, 1997

[54] ABSORBENT MATERIAL COMPRISING DRIED VEGETABLE PULP AND ITS USE FOR TREATING ORGANIC WASTE

[75] Inventors: Willem Peltenburg, Hoeven; Bastiaan Walraven; Diederick Meyer, both of Roosendaal; Harald Teeuwen, Klundert, all of Netherlands

[73] Assignee: Coöperatie Cosun U.A., Breda, Netherlands

[21] Appl. No.: 420,778

[22] Filed: Apr. 12, 1995

[51] Int. Cl.$^6$ .................................................. A01K 1/015
[52] U.S. Cl. ............................................................ 119/171
[58] Field of Search ................................. 119/171, 172, 119/173

[56] References Cited

U.S. PATENT DOCUMENTS

| | | |
|---|---|---|
| 1,967,333 | 7/1934 | Smith . |
| 3,821,346 | 6/1974 | Batley, Jr. ............................ 119/171 X |
| 3,928,322 | 12/1975 | Sugiyama et al. . |
| 3,972,971 | 8/1976 | Dantoni ............................... 119/171 X |
| 4,157,696 | 6/1979 | Carlberg . |
| 4,206,718 | 6/1980 | Brewer .................................... 119/171 |
| 4,451,489 | 5/1984 | Beale et al. .............................. 426/254 |
| 4,465,019 | 8/1984 | Johnson ................................... 119/171 |
| 4,519,340 | 5/1985 | Dickey .................................... 119/171 |
| 4,727,824 | 3/1988 | Ducharme et al. ....................... 119/171 |
| 5,127,956 | 7/1992 | Hansen et al. ............................. 127/42 |
| 5,415,131 | 5/1995 | Dodman ................................... 119/171 |

FOREIGN PATENT DOCUMENTS

| | | |
|---|---|---|
| 0022010 | 1/1981 | European Pat. Off. . |
| 0358554 | 3/1990 | European Pat. Off. . |
| 0590395 | 4/1994 | European Pat. Off. . |
| 0596128 | 5/1994 | European Pat. Off. . |
| WO9314626 | 8/1993 | WIPO . |

*Primary Examiner*—Robert P. Swiatek
*Assistant Examiner*—Yvonne R. Abbott
*Attorney, Agent, or Firm*—James Creighton Wray

[57] ABSTRACT

An absorbent material based on dried vegetable pulp, in which the dried vegetable pulp results from the extraction of a vegetable material with water and constitutes at least 50% of the material. The absorbent material is useful for treating organic waste, and is in particular proposed as pet litter material.

17 Claims, No Drawings

ABSORBENT MATERIAL COMPRISING DRIED VEGETABLE PULP AND ITS USE FOR TREATING ORGANIC WASTE

BACKGROUND OF THE INVENTION

This invention relates to a novel absorbent material of vegetable origin and to the use of materials of vegetable origin for treating organic waste. The invention more particularly relates to absorbent materials comprising dried vegetable pulp and to the use of dried vegetable pulp in methods for treating organic waste, such as in particular animal urine and faeces.

As a result of the increasing environmental consciousness nowadays, many of the most usual absorbent products used for treating animal waste, in particular in the form of litter for domestic animals, essentially cats, have become largely undesirable: many of these products are currently based on mineral materials (e.g. clay and marl) which can not be composted or burned. These materials accordingly to a large extent end up in collected domestic waste and thus increase the landfill problems or yield unburned residues in incineration plants.

Alternative animal litter materials which are being considered, based on recycled paper or wood, present other drawbacks linked to ink removal and the use of solvents and paper chemicals, to the consumption of trees, or to the use of wood preservation chemicals.

The use of dried vegetable pulp has been proposed for absorbent materials in general. U.S. Pat. No. 4,386,560 discloses preparing pet litter from a material obtained by drying the pulp resulting from the squeezing of citrus fruit or sugar beet. Japanese Patent 57-54573 discloses an absorbent material obtained by bleaching beet pulp in hypochloric acid. UK patent application GB 2.177.100 discloses absorbent pectin-containing vegetable materials resulting from the incorporation of substituents into residues of citrus juice processes and sugar beet refinery.

It has now been found surprisingly that certain specific types of dried vegetable pulp provide superior properties to absorbent materials without necessitating the special treatment steps of the known art, and thus provide a simplified approach to improved absorbent materials.

SUMMARY OF THE INVENTION

The present invention provides an absorbent material comprising dried vegetable pulp, characterised in that the vegetable pulp results from the extraction of a vegetable material with water and in that the dried extraction pulp constitutes at least 50% of the absorbent material and preferably at least 85% of the absorbent material. Thus the absorbent material preferably consists mainly of dried extraction pulp with at most up to 15% of additives generally known in the art, such as mineral materials (eg. kaolin, bentonite, attapulgite, sepiolite, talc, zeolite, calcium carbonate, etc.), fragrance, fungicide, deodorant, adhesive agents, etc., and most preferably not more than 10%, ideally less than 5% of such additives.

It is clearly preferred that any material used for the absorbent material beside the dried extraction pulp should be biodegradeable as well, to retain the environmental advantages of the invention.

According to a preferred embodiment of the invention the process for obtaining the dried extraction pulp is exempt from any bleaching step (which in itself would constitute an environmentally undesireable feature).

It is also preferred that the vegetable material submitted to extraction with water is in itself also chemically unmodified thus preferably excluding treatments which chemically modify the material such as roasting etc.

According to another preferred embodiment of the invention the process for preparing the dried extraction pulp is exempt from any treatment with acid or base solutions. In particular the dried extraction pulp can be used as such and surprisingly provides excellent absorbing performance without the incorporation of substituents containing cation exchange groups.

Suitable dried extraction pulp products for use in accordance with the invention comprise for instance citrus extraction pulp, sugar cane extraction pulp, sugar beet extraction pulp, chicory root extraction pulp, Jerusalem artichoke tuber extraction pulp and potato tuber extraction pulp. The preferred dried extraction pulp products however result from the extraction of dicotyledonous vegetable materials, in particular from roots or tubers, most preferably from the extraction of sugar beet, chicory root and Jerusalem artichoke tuber.

Dried extraction pulp as described above, in particular dried sugar beet extraction pulp, is a material which is readily available in large quantities and constitutes therefore a relatively inexpensive base material for the absorbing materials according to the invention.

It is a further objective of this invention to provide a new use for dried extraction pulp products. Such products are known per se. Thus for instance dried sugar beet extraction pulp and dried chicory root extraction pulp are known as a raw material for the manufacture of commercial cattle feed products. The new use for dried extraction pulp products, according to the invention, consists in using such products for treating organic waste, in particular animal waste and most particularly for treating animal urine and faeces. This latter use of dried extractior pulp in animal care and hygiene constitutes the use of said products as pet litter.

In the context of this invention the expression "animal" should be understood, in its broadest meaning, to include "humans"; although the preferred embodiments of the invention relate to the use of the absorbent materials for treating pet waste, the treatment of human waste is not excluded from the scope of the invention. As an example one may refer to the absorption of vomit, blood, urine and faeces in medical care environments.

DETAILED DESCRIPTION OF THE PREFERRED EMBODIMENTS

The dried extraction vegetable pulp for use in this invention can result from any extraction method. The expression "extraction method" specifically refers to a method in which the ingredients to be removed from the vegetable material are obtained by extracting the vegetable material directly by means of a liquid solvent, preferably water, rather than by squeezing the vegetable material to collect a juice.

A preferred process sequence in accordance to the invention comprises the following steps:
cutting of the vegetable material
swelling of the cut material in water, optionally at increased temperature
extracting the swollen material with a stream of water
draining the extracted material to obtain wet pulp pressing the wet pulp to so called presspulp drying the presspulp to dried extraction pulp, either with steam or air optionally hot air.

In the case of a typical extraction process of sugar beet or chicory root, the drained wet pulp has in general a dry matter content of about 12% by weight; the presspulp has typically a dry matter content of about 22 to 28% by weight and the dried extraction pulp has a typical dry matter content of approximately 85–95% by weight, preferably around 89%.

As mentioned before, the most preferred material for use in the absorbent material according to the invention consists of dried sugar beet extraction pulp or dried chicory root extraction pulp. The water absorption capacity of these pulps is about 4–9 times their own weight of water.

The dried extraction pulp can optionally be pressed, e.g. by means of an extrusion device into granular shape for convenience of handling and improvement of performance. This embodiment is a suitable way of performing the invention, but does not constitute a most preferred approach in that some proportion of the water absorption capacity is lost through the extrusion step.

Also, the dried extraction pulp may be sieved in order to obtain a more homogeneous size of the pulp particles and thus improve performance and/or convenience of handling. For example, big lumps contributing little to absorption capacity may be removed by sieving, as well as very small pulp particles that might give rise to dusting.

The absorbent materials according to the invention, in particular those based on dried extraction pulp of sugar beet and chicory root, when used for treating animal waste, show the following advantages with respect to conventional absorbent materials:

the materials result from a renewable feedstock, contrary to clay or marl.

the production process is environmentally friendly (extraction with water), whereas clay/marl exploitation affects landscape and biotopes.

after use it can be (almost) completely composted or burned.

on a weight basis, the water absorption capacity is at least five times better than clay/marl products.

the deodorising efficiency is noticeably better than with clay/marl products.

dusting is as good as with the best sieved clay/marl products, and much better than with unsieved clay/marl.

depending on whether granulation has been applied or not, it can be much lighter in weight (density up to three times lower) than clay/marl.

The present invention is illustrated by the following examples. However, it should be understood that the invention is not limited to specific details of these examples.

EXAMPLE 1

Absorbent material according to the invention based on dried extraction pulp of sugar beet. A batch of standard dried residue from a sugar beet processing campaign was packed in 10 liter bags for cat litter tests as reported in example 3.

EXAMPLE 2

Absorbent material according to the invention based on dried extraction pulp of chicory root. A batch of standard dried residue from a chicory root processing campaign was packed in 10 liter bags for cat litter tests as reported in example 3.

EXAMPLE 3

Comparative cat litter tests were carried out using standard clay/marl type litter in comparison with litter consisting of untreated dried sugar beet extraction pulp as it leaves the drying step of the process sequence indicated above.

Almost all cats accepted the alternative litter after a transitional progressive mixing in procedure of the pulp based material into the clay/marl based material. Most cats accepted an immediate replacement without "objecting". In one experiment the cat was offered the choice between clay/marl based litter, as it had always been using, a 50/50 clay/marl—pulp mixture and a 100% pulp litter. In this experiment the cat spontaneously chose the pulp litter.

The catowner-users' comments were in a large majority very favorable for the alternative litter, stressing as advantages:

improved deodorising improved ease of handling improved absorption capacity allowing less frequent replacement reduced garbage weight, and even reduced garbage volume when disposing of the spent litter on a composting stack, or using it as soil improver in gardens and greenhouses.

cleaner surrounding of the cat litter tray.

EXAMPLE 4

Comparative absorption tests of dried extraction pulp and dried squeezed pulp.

Comparative tests involving absorbent materials based on dried extraction vegetable pulp and absorbent materials based on dried squeezed vegetable pulp have indicated substantial advantages in properties for materials based on dried extraction pulp. Comparisons using sugar beet pulp showed more in particular a considerable difference in moisture absorption capacity as is illustrated in the following data:

absorption capacity of sugar beet pulp resulting from a squeezing process in accordance with U.S. Pat. No. 4,386,560: 200 parts of water per 100 parts of dried pulp (parts by weight);

absorption capacity of sugar beet extraction pulp, in accordance with the invention: at least 400 parts of water per 100 parts of dried pulp (parts by weight).

We claim:

1. Absorbent material comprising dried extraction pulp of a vegetable material extracted by means of water, said absorbent material produced by an extraction sequence comprising cutting of the vegetable material, swelling of the cut material in water;

extracting the solutes from the swollen material with a stream of water without squeezing, draining the extracted material to obtain wet pulp, pressing the wet pulp to presspulp, and drying the presspulp to dried extraction pulp, either with steam or hot air, wherein the absorbent material comprises at least 50% of dried extraction pulp.

2. The absorbent material of claim 1, wherein the dried extraction pulp consists of unbleached dried extraction pulp.

3. The absorbent material of claim 1, wherein the dried extraction pulp consists of extracted vegetable material not treated with an acid or a base.

4. The absorbent material of claim 1, wherein the vegetable material consists of tubers.

5. The absorbent material of claim 1, wherein the vegetable material consists of sugar beet.

6. The absorbent material of claim 1, wherein the vegetable material consists of chicory root.

7. The absorbent material of claim 1, wherein the vegetable material is selected from a group consisting of sugar beet and chicory root.

8. A method of treating organic waste comprising the steps of:

forming extraction pulp by extracting vegetable material by means of water according to an extraction sequence further comprising, cutting of the vegetable material, swelling of the cut material in water, extracting the solutes from the swollen material with a stream of water without squeezing, draining the extracted material to obtain wet pulp, pressing the wet pulp to presspulp, and drying the presspulp to dried extraction pulp, either with steam or hot air, for drying the extraction pulp, forming an absorbent material comprising the dried extraction pulp, and treating organic waste with the absorbent material.

9. The method of claim 8, wherein the absorbent material comprises at least 50% of the dried extraction pulp.

10. The method of claim 8, wherein treating the organic waste comprises treating animal waste.

11. The method of claim 8, wherein treating the organic waste comprises providing the absorbent material as pet litter.

12. The process of claim 8, wherein forming the extraction pulp excludes a treatment with an acid or a base.

13. A method of treating organic waste comprising the steps of:

forming unbleached extraction pulp by extracting vegetable material by means of water according to an extraction sequence further comprising, cutting of the vegetable material, swelling of the cut material in water;

extracting the solutes from the swollen material with a stream of water without squeezing, draining the extracted material to obtain wet pulp, pressing the wet pulp to presspulp, and drying the presspulp to dried extraction pulp, either with steam or hot air, for drying the extraction pulp, forming an absorbent material comprising the dried extraction pulp, and treating organic waste with the absorbent material.

14. The method of claim 13, wherein the absorbent material comprises at least 50% of the dried extraction pulp.

15. The method of claim 13, wherein treating the organic waste comprises treating animal waste.

16. The method of claim 13, wherein treating the organic waste comprises providing the absorbent material as pet litter.

17. The process of claim 13, wherein forming the extraction pulp excludes a treatment with an acid or a base.

\* \* \* \* \*